H. DUNKERLY.
HOPPER SCALE.
APPLICATION FILED APR. 10, 1909.

953,127.

Patented Mar. 29, 1910.
3 SHEETS—SHEET 1.

WITNESSES:
A. Austin.
Leland Sibley.

INVENTOR
Harry Dunkerly
BY
ATTORNEY

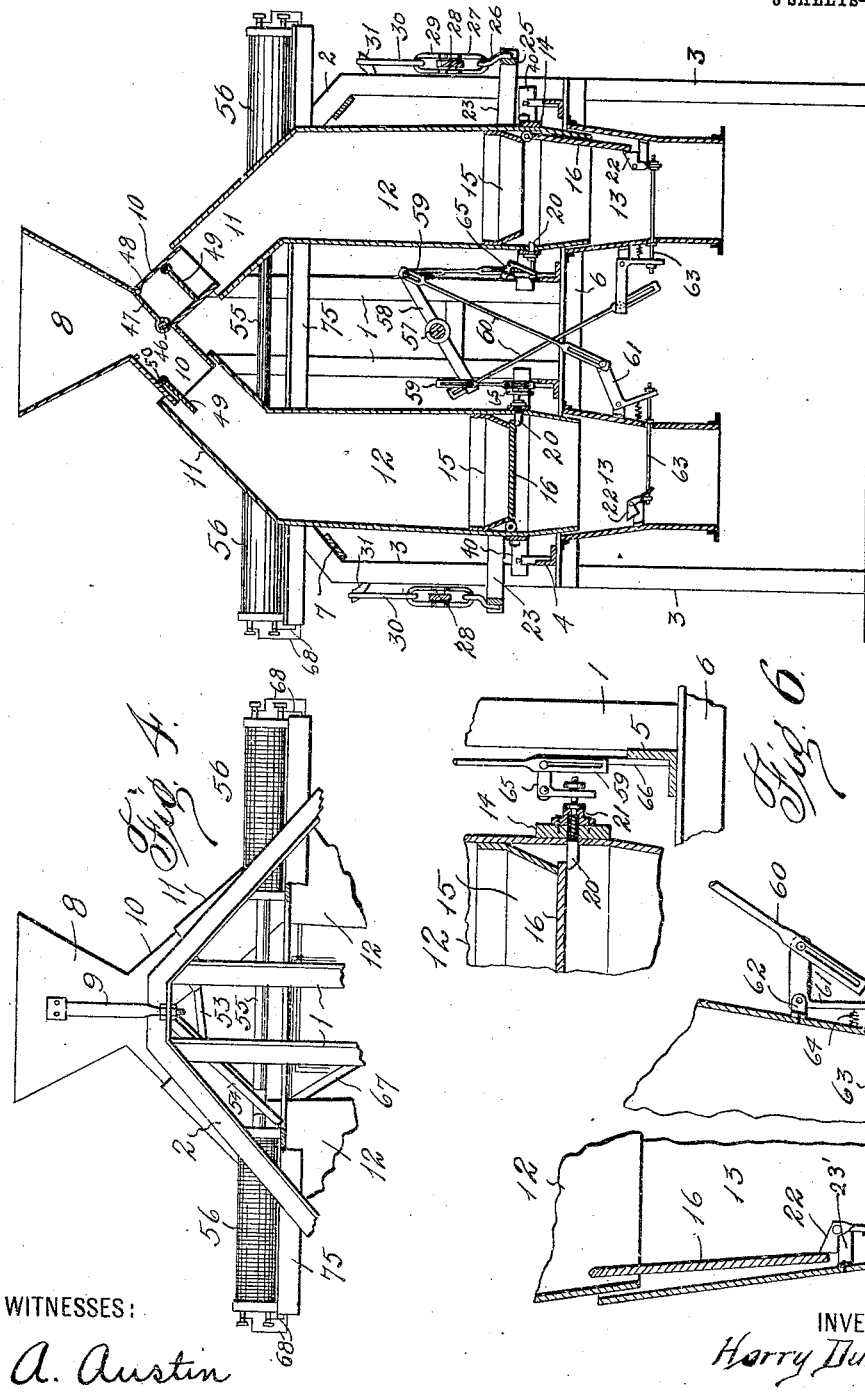

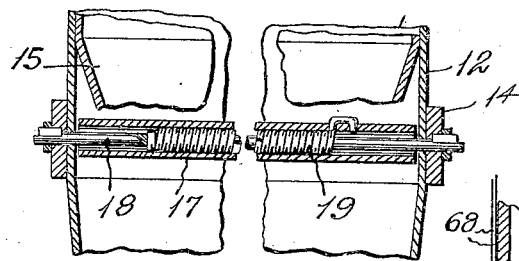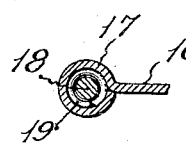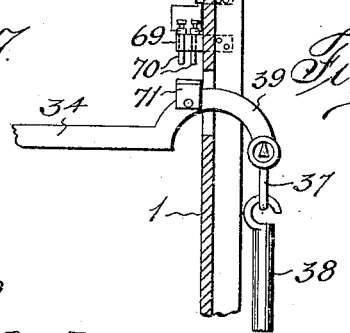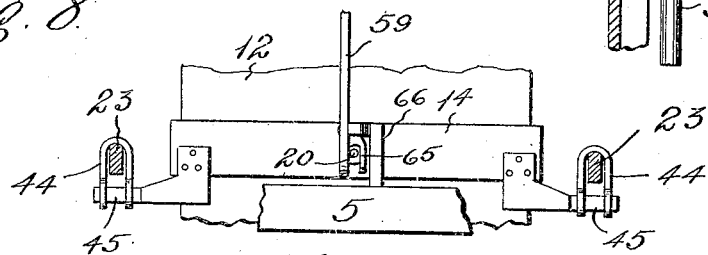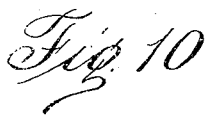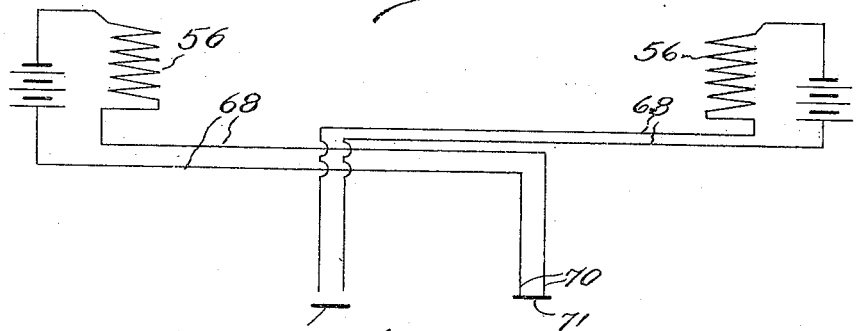

UNITED STATES PATENT OFFICE.

HARRY DUNKERLY, OF HOUSTON, TEXAS.

HOPPER-SCALE.

953,127. Specification of Letters Patent. Patented Mar. 29, 1910.

Application filed April 10, 1909. Serial No. 489,131.

*To all whom it may concern:*

Be it known that I, HARRY DUNKERLY, a citizen of the United States, residing at Houston, in the county of Harris and State of Texas, have invented a new and useful Hopper-Scale, of which the following is a specification.

My invention relates to new and useful improvements in hopper scales and more particularly to a double scale mechanism for weighing and bagging grain, flour, meal and the like.

The object of the invention is to provide a mechanism constructed with a view of simplicity and practicability, among the novel features of which are, vertically moving and non-swinging weighing bins, a double cut-off, electrically operated releasing mechanism, spring operated bin bottoms and other constructions.

Another feature resides in the downwardly flaring weighing bins, which being larger near their lower ends than at their upper ends, prevent flour and the like from arching across the bins; also the peculiar weighing mechanism which is very sensitive and requires only a limited movement.

Finally the object of the invention is to provide a mechanism of the character described that will be strong, durable and efficient, and one which will be accurate and in which the several parts will not be likely to get out of working order.

Figure 2:
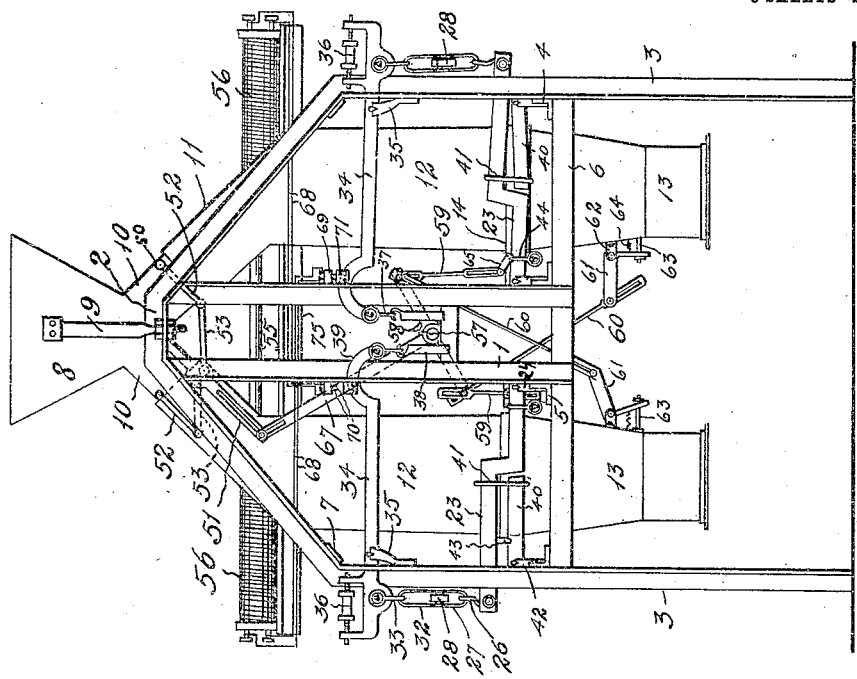
Figure 1:
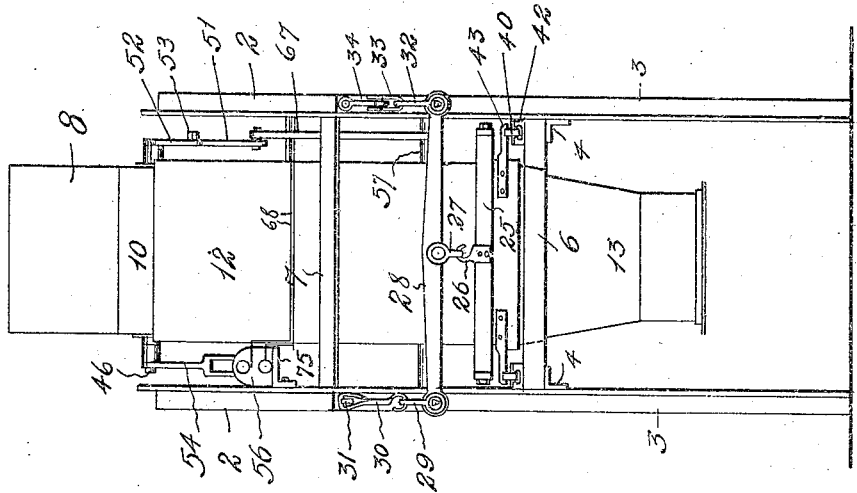

With the above and other objects in view, the invention has relation to certain novel features of construction and operation, an example of which is described in the following specification and illustrated in the accompanying drawings, wherein:

Figure 1 is an end elevation of my invention, Fig. 2 is a side elevation, Fig. 3 is a longitudinal vertical sectional view, Fig. 4 is an elevation of the upper portion of the side opposite to that shown in Fig. 2, Fig. 5 is a detail vertical section of the lower bin-bottom holding and releasing mechanism, Fig. 6 is a detail vertical section of the upper bin-bottom holding and releasing mechanism, Fig. 7 is a detail transverse section of one of the bin-bottoms and its supports, Fig. 8 is a transverse section of the hub portion of one of the bin-bottoms, Fig. 9 is a detail of the circuit closing mechanism, Fig. 10 is a detail of a portion of the inner end of one of the bins and its supports, and Fig. 11 is a diagrammatical view of the electric circuits.

In the drawings, the numeral 1 designates the central standards of a metallic frame preferably constructed of angular bars and comprising a truss-bar 2 on each side supported at each end on uprights 3 connected by side bars 6, the standards being secured to the cross bars at their lower ends and to the truss-bars at their upper ends. The frame is braced and connected transversely by cross bars 5, end bars 4 and flat bars 7.

A hopper 8 is supported above the truss-bars on arms 9 adjustably secured in the center of the said bars. At its lower end the hopper terminates in diverging chutes 10 extending, each at an angle of about 45 degrees. These chutes project, each a short distance into the contracted mouth 11 of a weighing bin 12. The mouth of each bin extending substantially parallel with the chute which it receives and being somewhat larger, will permit a free vertical movement of the bin without the mouth coming into contact with the chute. The bin proper extends vertically and is flared, as shown in Fig. 3, toward its lower end to gradually increase the width downward and prevent flour and the like from arching across the bin. The extreme lower end of each bin is contracted so as to freely project without contacting, into a fixed spout 13 suitably hung from the side bars 4.

As the weighing mechanism for each bin is the same, a description of one will suffice for both. Above the contracted portion of the bin, a metal band 14 is secured about the bin; while within the bin and a short distance above the band, a hopper frame 15 is fastened with its lower end terminating a short distance below the upper edge of the band on the outside, as is best shown in Figs. 6 and 7. A bin bottom or closure 16 is adapted to close against the lower end of the hopper frame and thus support the contents of the bin. This closure as shown in Figs. 7 and 8 is formed with a hub 17 surrounding a transverse shaft 18 having its ends keyed or fixed in the band 14. Between the shaft and the hub a space sufficient to receive a coiled spring 19 is provided, the spring having one end passed through the fixed shaft and the other secured to the hub;

whereby the closure upon being swung downward and released will be returned or swung up against the hopper frame. (See Fig. 3.) The closure is held up so as to support the load in the bin, by an inwardly spring-pressed latch 20 projecting through the band 14 and the side of the bin and supported in a housing 21 secured to the outside of the band as best shown in Fig. 6. When the closure is swung downward by the load and after the latch 20 has been withdrawn by mechanism hereinafter described, it depresses and engages behind, a bell-crank latch 22 pivoted on a bracket 23′ secured to the inside of the fixed spout 13 as is best shown in Fig. 5. When this latch 22 is swung by means hereinafter described, the closure will be released and swung upward by the coiled spring 19.

An offset scale arm 23 extends longitudinally, one on each side of the bin and pivotally supported at its inner end in a trunnion bracket 24 secured to the cross bar 5; while at its outer end it projects beyond the upright 3. The outer ends of the scale arm are connected, as is shown in Figs. 1 and 3, by a cross piece 25 rigidly attached thereto. Thus any swinging movement of the scale arms is transmitted to the cross piece, which at its center is provided with a hook 26 adapted to engage in a trunnion hanger 27 straddling at the center, a counter beam 28 extending across the end of the main frame as is clearly shown in Fig. 1. At one end the counter beam 28 has suitable engagement in a trunnion hanger 29 supported by a hook 30 resting on the end of a bracket 31 projecting from one of the uprights. This forms the pivot end of the counter beam from which it swings. The opposite end of the counter beam has similar engagement with a trunnion hanger 32 supported in a trunnion loop 33 engaging with a scale beam 34. The scale beam is pivoted in a trunnion bracket 35 projecting from the adjacent upright; while it is balanced by an adjustable weight-screw 36 at one end and a trunnion hanger 37 supporting a hook weight 38 at the opposite end. The inner end of the scale beam is arched at 39 and operates through the lateral wing of the central standard 1. Beneath the offset portion of each scale arm 23, a short arm 40 is supported at its inner end from the scale arm by a loop 41 and is pivoted at its outer end in a trunnion bracket 42 secured to the end bar 6. Each bin is supported at its outer end by knife edge lugs 43 notched over the short arms 40 and secured to the band 14. The support at the inner end comprises hangers 44 supported on the scale arms and receiving knife-edge trunnions 45 secured to the band 14 as shown in Fig. 10. By this arrangement each bin is permitted to move vertically, the scale arms and short arms swinging down at the center and the movement being transmitted and controlled by the scale beam 34 to which it is transmitted by the cross piece 25 and counter beam 28 and their connections. I wish to call attention to the fact that the bin moves a very short distance, as the scale beam is very sensitive and has only a limited swing, it being necessary to merely swing the arched end 39 of the scale beam a few inches to operate the cut off means and deflect the load from the hopper into the other bin.

The cut off means comprises a transverse shaft 46 extending through the hopper and projecting from each side thereof. This shaft is disposed at the intersection of the bottoms of the chutes 10 as shown in Fig. 3, and receives a deflecting valve or gate 47 adapted to rest against stops 48 at the entrance to each chute and cut off the supply thereto and to lie at such an angle as to deflect or guide the load or material into the open chute. Near the lower end of each chute a cut off valve 49 is fixed on a shaft 50 projecting through the wall of the chute. It will be noted that the shafts 46 and 50 lie, substantially in the same horizontal plane, the valves 49 extending downward and the valve 47 upward. These valves are caused to occupy certain positions by means of levers 51 and 52 secured to the adjacent projecting ends of the shafts 46 and 50 respectively. The levers 52 are connected to the central lever 51, which is considerably longer, by means of links 53. The levers are thus swung in unison by the central lever. When the levers are connected, the valves 49 are positioned so that one will stand across the chute, while the other extends down the chute as shown in Fig. 3, and also so that the one extending across the chute will always be beneath the deflector valve when the latter closes the chute.

It is obvious that by swinging the central lever the valves are swung and the load cut off from and deflected into the bins alternately. It will be observed that considerable space is had between the deflecting valve and the cut off valve when the latter is swung across the chute. By this arrangement the material in the chute is caught and held after the deflecting valve has started to swing to close the chute. Ordinarily this material would drop into the bin, giving more material therein than was actually weighed.

On the end of the shaft 46 opposite to that supporting the central lever 51, an operating lever 54 is secured at its upper end and extends in substantially the same direction as the central lever. As shown in Fig. 4, the lower end of the lever 54 engages the sliding core 55, operating between solenoids 56 mounted on a bracket 75 secured to the inner side of the truss-bar 2, as shown in Fig. 1. It is obvious that as the solenoids are alternately energized, the core will be reciprocated and the lever 54 swung, thus rocking the shaft 46 and swinging the valves 47 and 49 to deflect the load first into one bin and then into the other. The solenoids each have a separate circuit, which circuits are alternately closed as will be hereinafter described.

Between the standards 1, and above the scale arms 23, a transverse rock shaft 57 is suitably mounted, while a lever 58 is carried at the center of the latter. At each end of the lever a link 59 and a rod 60 having its ends slotted, are pivotally connected thereto as shown in Figs. 2 and 3, the links being pivoted on opposite sides of the lever and likewise, the rods. The rods are crossed and have their lower slotted ends in pivotal engagement with bell-crank levers 61 supported by brackets 62 secured to the outer sides of the spouts 13, as shown in Fig. 5. At its lower end, each bell-crank lever has engagement with a horizontal rod 63 extending through the spout and connected to the lower end of the latch 22. When one end of the lever 58 is swung upward and the rod 60 has moved sufficient to take up the play by reason of its slotted ends, the lever 61 will be swung so as to draw the rod 63 outward, swinging down the latch 22 and releasing the closure 16 which is swung upward by the coiled spring in its hub. A coiled spring 64 serves to return the lever 61 to its normal position.

Each link 59, which is slotted to permit a certain amount of lost motion, has pivotal engagement at its lower end with a bell-crank lever 65 pivoted on an angular bracket 66 supported from the adjacent cross bar 5, as shown in Figs. 6 and 10. This lever has engagement with the latch 20, so that when one end of the lever 58 is swung upward, the link after moving the proper distance will swing the bell-crank lever 65 outward, thus withdrawing the latch 20 and permitting the load in the bin to swing the closure 16 down until it engages behind the latch 22.

By crossing the rods 60, the latch 20 of one bin and the latch 22 of the other bin will be operated simultaneously; or in other words when a bin has received its full load and the electric circuit closed, the solenoid on the opposite end of the scales or over the other bin, will be energized, the core 55 drawn into it and the lever 54 swung.

When the lever 54 is swung, the valves are operated to close the first bin and the shaft 46 rocked. This shaft has fixed on its end the lever 51 which is slotted at its lower end and has pivotal connection with the upper slotted end of a lever 67 fixed on the shaft 57. Consequently the end of the lever 58 next to the first bin or right hand bin with relation to Figs. 2 and 3, is swung up, when the shaft 57 is rocked, and the rod 60 and link 59 operate the latch 22 of the second or left hand bin and the latch 20 of the first or right hand bin, respectively. This releases the closure 16 of the second and permits it to swing up and catch behind its latch 20; while the closure of the first bin is released so that the load may force it down. The operation is reversed when the second bin is loaded and the first bin emptied.

The electrical circuits are illustrated in Fig. 11 and comprise wires 68 running from the solenoids to circuit closers, one supported on the standard over each scale beam. It will be noted that there are two separate circuits, one wire of which has connection with a battery or other source of electrical supply; and further one crosses the other so that the circuit being closed by the scale beam of one bin energizes the solenoid over the second bin and shifts the valves so as to load the second bin.

The circuits may be closed in various ways. In Fig. 9 I have shown circuit closers, each comprising a bracket 69 secured to the standard 1 over the arched end 39 of the scale beam 34 and provided with insulated and separated contact posts 70 adapted to be engaged by a contact clip 71 carried on the end 39 of the scale beam. This contact clip is insulated from the scale beam and when the bin is loaded to the desired weight and its end swung up, causing the clip to contact with the posts, the circuit is closed.

What I claim, is:

1. In a hopper weighing machine, a frame, a rigidly supported hopper having opposite outlets and mounted on the frame, individual weighing mechanisms, a bin supported by each weighing mechanism, the bins adapted to receive the hopper outlets without contacting therewith, said bins adapted to receive loads from the hopper, a fixed spout supported below each bin, means for controlling the delivery of the load to each bin, a closure hinged within each bin to support the load, holding and releasing means for the closure, and a common means for operating the controlling means and the holding and releasing means.

2. In a hopper weighing machine, a frame, a hopper having delivery chutes and mounted on the frame, individual weighing mechanisms pivoted on the frame, a vertically movable bin supported by each weighing mechanism and adapted to receive the delivery chutes without contact therewith, a fixed spout below each bin, the said bins being arranged to receive loads from the hopper, means for controlling the delivery of the load to the bins, a closure arranged in each bin to support the load, holding and releasing means for the closure, and a common means for operating the controlling means and the holding and releasing means.

3. In a hopper weighing machine, a frame, a hopper having opposed outlets and mounted on the frame, a double cut off in the hopper adapted to retain a certain amount of the material, individual weighing mechanisms, a bin supported by each weighing mechanism, said bins adapted to receive loads from the hopper, means for controlling the delivery of the load to the bins, a closure hinged within each bin to support the load, holding and releasing means for the closure, and a common means for operating the controlling means and the holding and releasing means.

4. In a hopper weighing machine, a frame, a hopper having delivery chutes and mounted on the frame, a deflecting valve in the hopper adapted to deflect the load into one chute or the other, a cut-off valve in each chute some distance below the deflecting valve adapted to be swung across the chutes alternately, the valves being connected by means for simultaneously swinging the same, individual weighing mechanisms, a bin supported by each weighing mechanism, said bins adapted to receive loads from the hopper, a fixed spout below each bin into which the bin projects, a closure hinged within each bin to support the load, holding and releasing means for the closure, and a common means for operating the swinging means and the holding and releasing means.

5. In a weighing bin for hopper scales mechanism, a body supported to move vertically, a hopper frame secured within the body, a closure hinged within the body and adapted to be closed against the hopper frame, and means for closing the closure.

6. In a hopper scale mechanism, a fixed hopper, a vertically movable weighing bin supported beneath the hopper, a fixed spout supported below the bin, scale arms supporting the bin at each side, two of said arms being extended beyond the end of the bin, a counter beam across the bin having connection with the extended scale arms, and a scale beam at one side of the bin having connection with the counter beam.

7. In a hopper scale mechanism, a frame, a hopper rigidly supported on the frame, a spout fixed on the frame, a weighing bin disposed to move vertically in the frame between the hopper and the spout, scale arms mounted on the frame at each side of the bin, a scale beam pivoted on the frame at one side of the bin having connection with the scale arms, a closure hinged in the bin adapted to be opened by the load, and means for closing the closure.

8. In a hopper scale mechanism, a frame, a hopper supported on the frame, a spout fixed on the frame, a weighing bin disposed to move vertically between the hopper and the spout, connected scale arms mounted on the frame, a scale beam pivoted on the frame having connection with scale arms, and a closure arranged in the bin adapted to be opened by the load.

9. In a hopper scale mechanism, a frame, a hopper supported on the frame, a spout fixed on the frame, a weighing bin disposed to move vertically between the hopper and the spout, connected scale arms mounted on the frame, a scale beam pivoted on the frame having connection with two of the arms, and a closure arranged in the bin adapted to be opened by the load.

10. In a hopper scale mechanism, a frame, a hopper supported on the frame, a spout fixed on the frame, a weighing bin disposed to move vertically between the hopper and the spout, connected scale arms on each side mounted on the frame, a single scale beam connected with one of the arms on each side, and a closure hinged within the bin adapted to be opened by the load.

11. In a hopper scale mechanism, a frame, a hopper supported on the frame, a spout fixed on the frame, a weighing bin disposed to move vertically between the hopper and the spout, connected scale arms on each side mounted on the frame, a single scale beam connected with one of the arms on each side, a closure arranged in the bin adapted to be opened by the load, and means within the bin for closing the closure.

12. The combination with a movable weighing bin, of a load supporting bottom hinged within the bin, a coiled spring associated with the bottom, the bottom adapted to be swung downward against the tension of the spring and to be returned by the spring, and means for holding the bottom in position to receive the load.

13. In a hopper scales mechanism, a frame, a hopper mounted on the frame, a fixed spout supported from the frame, a vertically movable weighing bin disposed between the hopper and the spout, scale arms pivoted on the frame, a scale beam pivoted on the frame and having connection with the scale arms, a closure hinged within the bin adapted to be opened by the load, and resilient means for closing the closure.

14. In a hopper scales mechanism, a frame, a hopper mounted on the frame, a fixed spout supported from the frame, a vertically movable weighing bin disposed between the hopper and the spout, scale arms pivoted on the frame, a scale beam pivoted on the frame and having connection with the scale arms, a closure hinged within the bin adapted to be opened by the load, resilient means for closing the closure, and automatically operated holding and releasing means for the closure.

15. In a hopper scales mechanism, a frame, a hopper mounted on the frame, a fixed spout supported from the frame, a vertically movable weighing bin disposed between the hopper and the spout, scale arms pivoted on the frame, a scale beam pivoted on the frame and having connection with the scale arms, a closure in the bin adapted to be opened by the load, resilient means for closing the closure, holding and releasing means for the closure, and means controlled by the scale beam for operating the holding and releasing means.

16. In a hopper scales mechanism, a frame, a hopper mounted on the frame, a fixed spout supported from the frame, a vertically movable weighing bin disposed between the hopper and the spout, scale arms pivoted on the frame, a scale beam pivoted on the frame and having connection with the scale arms, a closure in the bin adapted to be opened by the load, resilient means for closing the closure, a latch for holding the closure across the bin to support the load, means for withdrawing the holding means, means for retaining the closure in its open position, and means for withdrawing the retaining means.

17. In a hopper scales mechanism, a frame, a hopper mounted on the frame, a fixed spout supported from the frame, a vertically movable weighing bin disposed between the hopper and the spout, scale arms pivoted on the frame, a scale beam pivoted on the frame and having connection with the scale arms, a closure in the bin adapted to be opened by the load, resilient means for closing the closure, a latch for holding the closure across the bin to support the load, means for withdrawing the holding means, means for retaining the closure in its open position, means for withdrawing the retaining means, and means controlled by the scale beam for operating the withdrawing and the retaining means.

18. In a hopper scales mechanism, a frame, a hopper mounted on the frame, chutes extending from each side of the hopper, a deflecting valve arranged in the hopper adapted to alternately close the chutes, weighing bins into which the chutes freely project without contacting, spouts fixed below the bins, scale arms mounted on the frame and movably supporting the bins, a scale beam for each bin fulcrumed on the frame and having connection with the scale arms of its respective bin, a bin bottom in each bin adapted to support the load and to swing downward to discharge the load, and means for holding the bottoms in position.

19. In a hopper scales mechanism, a frame, a hopper mounted on the frame, chutes extending from each side of the hopper, a deflecting valve arranged in the hopper adapted to alternately close the chutes, weighing bins into which the chutes freely project without contacting, spouts fixed below the bins, scale arms mounted on the frame and movably supporting the bins, a scale beam for each bin fulcrumed on the frame and having connection with the scale arms of its respective bin, a bin bottom in each bin adapted to support the load and to swing downward to discharge the load, means for swinging each bottom upward to its normal position, and means for holding the bottoms in position.

20. In a hopper scales mechanism, a frame, a hopper mounted on the frame, chutes extending from each side of the hopper, a deflecting valve arranged in the hopper adapted to alternately close the chutes, weighing bins receiving the chutes, spouts fixed below the bins, scale arms mounted on the frame and movably supporting the bins, a scale beam for each bin fulcrumed on the frame and having connection with the scale arms of its respective bin, a bin bottom in each bin adapted to support the load and to swing downward to discharge the load, means for swinging each bottom upward to its normal position, means for holding the bottoms in position, means for operating the holding means to release the bin bottoms, and means caused to operate by the scale beam of one bin to operate the releasing means of the other bin.

21. In a hopper scales mechanism, a frame, a hopper mounted on the frame, chutes extending from each side of the hopper, a deflecting valve arranged in the hopper adapted to alternately close the chutes, weighing bins receiving the chutes, spouts fixed below the bins, scale arms mounted on the frame and movably supporting the bins, a scale beam for each bin fulcrumed on the frame and having connection with the scale arms of its respective bin, a bin bottom in each bin adapted to support the load and to swing downward to discharge the load, means for swinging each bottom upward to its normal position, means for holding the bottoms in position, means for operating the holding means to release the bin bottoms, and means caused to operate by the scale beam of one bin to operate the releasing means of the other bin, said last named means also operating the deflecting valve.

22. In a hopper scales mechanism, a frame, a hopper mounted on the frame, chutes extending from each side of the hopper, a deflecting valve arranged in the hopper adapted to alternately close the chutes, weighing bins receiving the chutes, spouts fixed below the bins, scale arms mounted on the frame and movably supporting the bins, a scale beam for each bin fulcrumed on the frame and having connection with the scale arms of its respective bin, a bin bottom in each bin adapted to support the load and to swing downward to discharge the load, means for swinging each bottom upward to its normal position, means for holding the bottoms in position, the bottom of one bin being closed when the other is open, means for holding the bottoms in their closed position, means for holding the bottoms in their open position, means for operating the holding means alternately whereby the bottom of one bin is opened and the other closed, opposed solenoids for operating the last named means and the deflecting valve, and circuit closers having connection with the solenoids and operated by the scale beams.

In testimony whereof I have signed my name in the presence of two witnesses.

HARRY DUNKERLY.

Witnesses:
ROBERT L. COLE,
M. B. SCHLEY.